Nov. 27, 1923.
T. D. MORAN
ATTACHMENT FOR DISK HARROWS
Filed Sept. 5, 1922
1,475,312
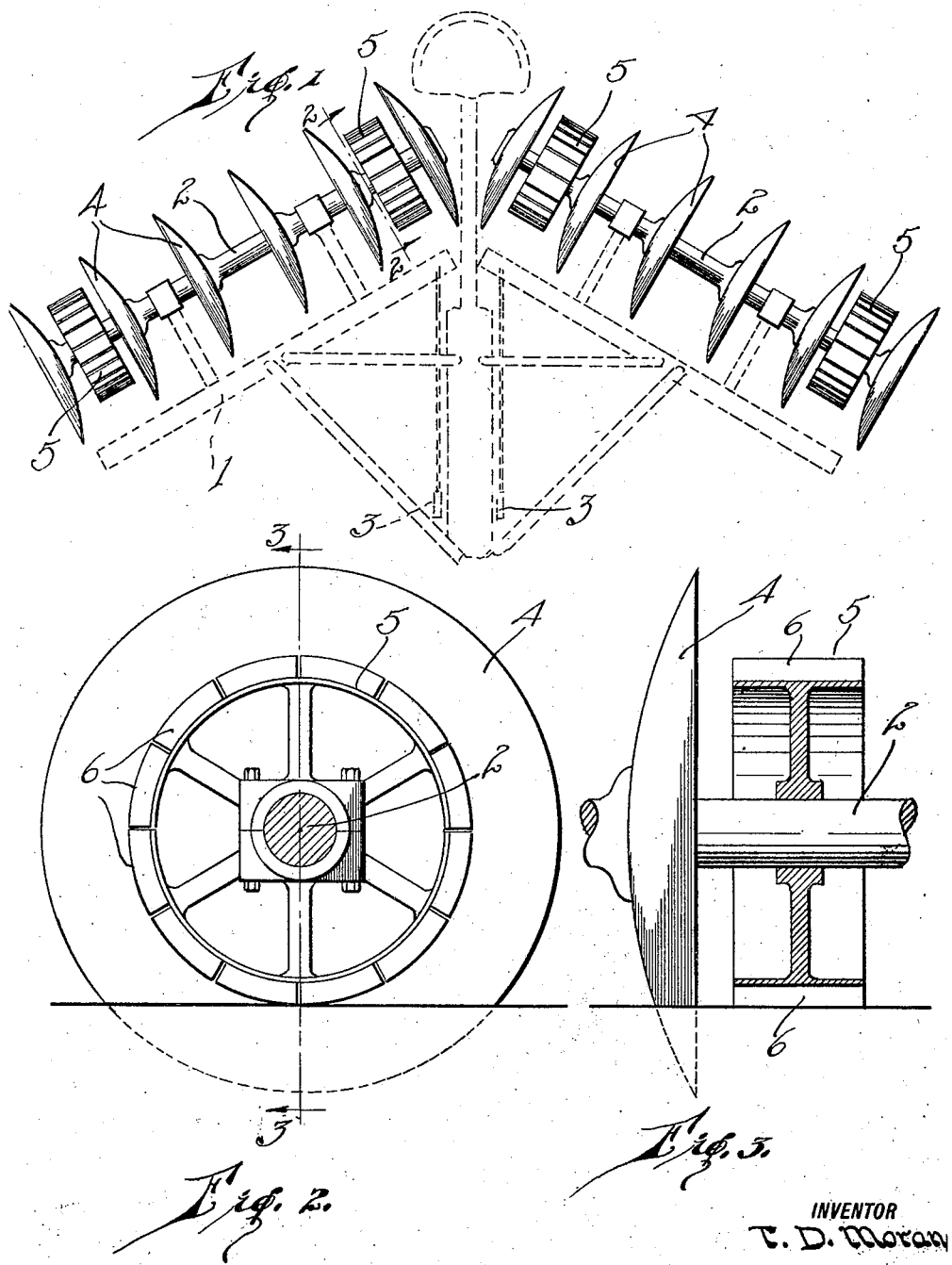
INVENTOR
T. D. Moran
BY
ATTORNEYS Patented Nov. 27, 1923.

1,475,312

UNITED STATES PATENT OFFICE.

THERON D. MORAN, OF DILLON, MONTANA.

ATTACHMENT FOR DISK HARROWS.

Application filed September 5, 1922. Serial No. 586,228.

*To all whom it may concern:*

Be it known that I, THERON D. MORAN, a citizen of the United States, and a resident of Dillon, in the county of Beaverhead and State of Montana, have invented a new and useful Improvement in Attachments for Disk Harrows, of which the following is a full, clear, and exact description.

My invention relates to improvements in attachments for disk harrows, and it consists in the combinations, constructions, and arrangements herein described and claimed.

It is a well known fact that in harrowing the ground, the disks will cut deeper into the ground when they are turned at a greater angle with respect to the direction of the harrow. For example, if the disks are set so as to dig all of the ground, they will sink to their hubs. The farmer is desirous, in many instances, to cut the entire ground to a depth of say two and one-half inches in order to remove the weeds. With the ordinary harrow, the disks have to be set at a certain angle in order to cut to a depth of two and one-half inches, this angle not being sufficient for the adjacent disks to dig all of the ground therebetween. In other words, the same amount of ground has to be gone over a number of times when it is desired to dig the ground to a depth of two and one-half inches.

The principal object of my invention is to provide an attachment for harrows or the like which will gauge the depth of the cut made by the disks even though the disks are set so as to cut the entire ground with one going over.

A further object of my invention is to provide a device of the type described which may be readily attached to harrows of ordinary construction without any alterations being necessary in the latter.

A further object of my invention is to provide a device of the type described which is simple in construction, and which may be secured to a harrow with the minimum amount of time and labor.

Other objects and advantages will appear in the following specification, and the novel features of the invention will be particularly pointed out in the appended claim.

My invention is illustrated in the accompanying drawings, forming part of this application, in which—

Figure 1 is a plan view of a harrow, showing the device operatively applied thereto, Figure 2 is a section along the line 2—2 of Figure 3, and Figure 3 is a section along the line 3—3 of Figure 2.

In carrying out my invention, I make use of an ordinary harrow or other like implement which employs disks for digging the ground. The harrow comprises the essential parts to such an implement, such as a frame 1, gangs 2, gang actuating levers 3, and disks 4.

I then dispose traction wheels 5 between the disks 4 which may be of any desired diameter, the size of the wheels being governed by the depth of the cut desired to be made. For example, if a 16 inch disk is used, and it is desired to make a cut of $2\frac{1}{2}$ inches, a 11 inch wheel is used. In case the disk is 18 inches in diameter, a 13 inch wheel is used to make the disk cut $2\frac{1}{2}$ inches into the ground. The wheels are relatively wide so as to give the proper supporting surface, and yet narrow enough so as not to interfere with the normal operation of the disks, or disk cleaning teeth (not shown). The wheels are split, whereby they may be readily assembled to the harrow without any alterations being necessary in the latter.

From the foregoing description of the various parts of the device, the operation thereof may be readily understood. The number of wheels 5 necessary for a harrow depends upon the size of the harrow. For a 10 foot harrow, six wheels are sufficient for the successful operation of the harrow. As heretofore stated, the size of the wheel is varied with respect to the disk, so as to vary the cutting depth of the harrow. When it is desired to dig the entire surface, over which the harrow travels, the levers 3 are actuated so as to swing the gangs into the desired positions. The disks are now positioned with respect to each other so as to dig all of the ground. With the ordinary harrow, the disks would sink into the ground up to their hubs, when the disks cut all of the surface. With my device attached to the harrow, the disks can only sink into the ground to the depth permitted by the wheels. In this manner, the ground can be dug with one going over and to any depth desired.

The device may be applied to any harrow without any changes being necessary. Since the wheels are split, they can be quickly mounted on the harrow, without the necessity of removing the disks, thereby resulting in saving of a great deal of time and labor. The wheels 5 can be provided with traction blocks 6 if desired.

I claim:

The combination with a harrow having shafts and concavo convex disks carried by said shafts, of split wheels mounted on said shafts and being disposed between certain of said disks, said wheels consisting of two separable halves, a bearing box carried by each half, and bolts removably securing the halves of said wheels together, whereby said wheels can be readily assembled or disassembled from the shafts without the necessity of first disassembling the disks from the shafts.

THERON D. MORAN.